(12) United States Patent
Björnhov et al.

(10) Patent No.: US 10,584,738 B2
(45) Date of Patent: Mar. 10, 2020

(54) KINEMATIC PAIRS

(71) Applicant: Corebon AB, Arlöv (SE)

(72) Inventors: Tobias Björnhov, Falsterbo (SE); Rasmus Olsson, Göteborg (SE)

(73) Assignee: COREBON AB, Arlöv (SE)

( * ) Notice: Subject to any disclaimer, the term of this patent is extended or adjusted under 35 U.S.C. 154(b) by 707 days.

(21) Appl. No.: 15/112,168

(22) PCT Filed: Jan. 16, 2015

(86) PCT No.: PCT/EP2015/050813
§ 371 (c)(1),
(2) Date: Jul. 16, 2016

(87) PCT Pub. No.: WO2015/107169
PCT Pub. Date: Jul. 23, 2015

(65) Prior Publication Data
US 2016/0333923 A1    Nov. 17, 2016

(30) Foreign Application Priority Data
Jan. 16, 2014  (EP) ..................................... 14151481

(51) Int. Cl.
*F16C 11/06*  (2006.01)
(52) U.S. Cl.
CPC ...... *F16C 11/0685* (2013.01); *F16C 11/0623* (2013.01)

(58) Field of Classification Search
CPC .............. F16C 11/0614; F16C 11/0685; F16C 11/0623; F16C 11/0628; F16C 11/0633; F16C 11/0638; F16B 2001/0021; B29C 43/00; B29C 43/006
See application file for complete search history.

(56) References Cited

U.S. PATENT DOCUMENTS

| 2,251,126 A |   | 7/1941 | Gatke |   |
|---|---|---|---|---|
| 2,835,521 A |   | 5/1958 | White |   |
| 3,458,223 A | * | 7/1969 | White | F16C 11/0633 384/297 |
| 3,536,367 A |   | 10/1970 | Papish |   |
| 3,594,049 A | * | 7/1971 | Turner | F16C 11/0614 29/898.047 |

(Continued)

FOREIGN PATENT DOCUMENTS

| CN | 101529101 A | 9/2009 |
|---|---|---|
| DE | 3522013 A1 | 1/1987 |

(Continued)

*Primary Examiner* — Jonathan P Masinick
(74) *Attorney, Agent, or Firm* — Lowe Graham Jones PLLC

(57) ABSTRACT

A kinematic pair (10), e.g. a ball and socket joint, with at least a housing element (30) and an engagement element (20) where the engagement element (20) is arranged at least partly within the housing element (30) and configured to achieve a rotational and/or sliding movement relative the housing element (30). The housing element (30) is designed with at least one first carbon fiber composite material layer surrounding at least a part of the engagement element, a carbon fiber composite material wrapping arranged around at least a part of the first layer, and at least one second carbon fiber composite material layer arranged on the outside of the wrapping.

17 Claims, 9 Drawing Sheets

(56) References Cited

U.S. PATENT DOCUMENTS

| | | | |
|---|---|---|---|
| 4,054,337 A | 10/1977 | Matt et al. | |
| 4,846,590 A * | 7/1989 | Teramachi | B22D 19/12 384/206 |
| 5,129,148 A * | 7/1992 | Adams | F16C 7/026 29/898 |
| 6,176,379 B1 * | 1/2001 | Daugherty, Jr. | B61G 5/02 105/3 |
| 6,390,313 B1 * | 5/2002 | Ring | B61G 9/24 213/50 |
| 6,691,883 B1 * | 2/2004 | Daugherty, Jr. | B61G 5/02 213/62 R |
| 2004/0208406 A1 | 10/2004 | Budde et al. | |
| 2007/0140607 A1 | 6/2007 | Lee | |
| 2009/0050594 A1 * | 2/2009 | Bui | B61G 9/20 213/75 R |

FOREIGN PATENT DOCUMENTS

| | | |
|---|---|---|
| FR | 2140755 A5 | 1/1973 |
| JP | S60151414 A | 8/1985 |
| JP | 01-026004 A | 1/1989 |
| JP | 2620690 B | 6/1997 |
| JP | 2002-011799 A | 1/2002 |
| JP | 2008-038038 A | 2/2008 |
| WO | 2007/084901 A2 | 7/2007 |
| WO | 2015/036989 A1 | 3/2015 |

\* cited by examiner

KINEMATIC PAIRS

PRIORITY CLAIM

This invention claims priority from PCT Application Serial No. PCT/EP2015/050813 filed Jan. 16, 2015, which claims priority to European Application Serial No. 14151481.0 filed Jan. 16, 2014, which is hereby incorporated by reference.

TECHNICAL FIELD

The present invention relates to kinematic pairs and more specifically to kinematic pairs allowing rotational and/or sliding movements.

BACKGROUND

Kinematic pairs of different types are well known and widely used. One example of such a pair is disclosed in WO 2007/084901, where a ball joint has a ball with an attached shank, an inner bearing and an outer bearing both having a wear surface, and a biasing element made from a Belleville washer type spring. Furthermore, the ball joint has a socket which is closed at its inner end and which has an opening at its outer end. The ball joint is assembled in a first step where the biasing element is inserted into the socket and in a second step where the inner bearing is inserted into the socket, followed by the ball with the attached shank and the outer bearing. In this arrangement, the inner bearing rests on the biasing element and the ball is kept between the wear surfaces of the inner and the outer bearing, while the shank—which is attached to the ball—is passed through an opening in the outer bearing. In order to finalize the assembly of the ball joint, the outer bearing is pressed into the socket against the preload force of the biasing element and the outer rim of the socket is folded inside towards a centre of the socket's opening. Due to the folded rim, the outer bearing is kept in place inside the socket and the compression of the ball between the inner and the outer bearing is maintained for providing a stiffness of the ball joint.

This known ball joint has a number of disadvantages: it comprises a large number of parts and there are production-related deviations in the shape and size of the ball and the inner and outer bearing. Furthermore, due to the limiting accuracy with which rim is folded inwards, the compression of the ball between the inner and the outer bearing varies for every ball joint.

SUMMARY

An object of the present invention is to provide improvements over prior art. This object is achieved by a technique defined in the appended independent claims; certain embodiments being set forth in the related dependent claims.

In a first aspect of the present invention, there is provided a housing element for a kinematic pair, where the kinematic pair comprises the housing element and an engagement element, wherein the engagement element is arranged at least partly within the housing element and configured to achieve a rotational and/or sliding movement relative the housing element. The housing element comprises at least one first carbon fiber composite material layer surrounding at least a part of the engagement element, a carbon fiber composite material wrapping arranged around at least a part of the first layer, and at least one second carbon fiber composite material layer arranged on the outside of the wrapping. This structure of a housing element creates a strong and precise construction with respect to the engagement element located within. This structure also has a pre-tension which means that there is no play or backlash between the housing element and the engagement element. Another advantage is the use of the carbon fiber composite material which is strong, durable and has a low weight. The material has a high strength-weight-ratio which is very desirable for a housing element of a kinematic pair.

In an embodiment of the invention, the first and second layers comprise a braided texture of a carbon fiber composite material. This braided texture provides the material with an even distribution of tension along the entire piece of material.

In another embodiment, the first layer and said second layers form parts of one and the same carbon fiber composite material piece. This is advantageous since the components of the structure are held tightly together by one piece of material. Also, the distribution of tension in the material is evenly distributed over an area so that the engagement element does not grab hold of or stick to the seat of the housing element.

In another embodiment, the housing element further comprises a coating element which is arranged on the surface of the first carbon fiber composite material layer facing the engagement element and where the coating element comprises a graphite based material, such as, but not limited to vapor grown carbon nano tubes. The coating element makes sure that the engagement element may rotate and/or slide freely without unnecessary friction; it provides even better anti-friction properties.

In a second aspect of the present invention, there is provided a kinematic pair comprising at least a housing element as described above and an engagement element, where the engagement element is arranged at least partly within the housing element and configured to achieve a rotational and/or sliding movement relative the housing element. The kinematic pair will have all the above described advantages.

In an embodiment of the invention, the housing element is a socket and the engagement element is a ball, together forming a ball and socket joint, wherein the socket comprises an upper portion with a rim which is arranged at an angle relative to the center of the ball, and wherein the angle is between 5 and 85°, preferably between 25 and 55°. For known ball and socket joints techniques it is not possible to design a joint with such a small angle and keep a required stiffness, but with the structure and the components described above even an angle between 5° and 30° is possible which provides the engagement element within the housing element with a much greater freedom of movement.

In a third aspect of the invention, there is provided a method for manufacturing a housing element of a kinematic pair, wherein the kinematic pair comprises a housing element and an engagement element and wherein the engagement element is arranged at least partly within the housing element and configured to achieve a rotational and/or sliding movement relative the housing element. The method comprises the steps of:
  arranging at least one first carbon fiber composite material layer around at least a part of the engagement element;
  winding a carbon fiber composite material around at least a part of said first layer forming at least one wrapping; and
  arranging at least one second carbon fiber composite material layer on the outer most wrapping.

This method produces a housing element which is of strong and precise structure with respect to the engagement element located therein and with all the above mentioned advantages.

In an embodiment the method, further comprises the step:

winding said carbon fiber composite material around at least a part of said second layer forming at least one outer wrapping. By adding an outer wrapping the second layer and the structure is locked in position.

In another embodiment, the step of arranging at least one second carbon fiber composite material layer further comprises:

folding a portion of the first layer over the wrapping forming the second layer.

This is advantageous since the components of the structure are held tightly together by one piece of material. Also, the distribution of tension in the material is evenly disposed over an area so that the engagement element does not grab hold of the seat of the housing element.

BRIEF DESCRIPTION OF THE DRAWING

Embodiments of the invention will be described in the following, reference being made to the appended drawings which illustrate non-limiting examples of how the inventive concept can be reduced into practice.

DETAILED DESCRIPTION OF THE EMBODIMENTS

Figure 1A:
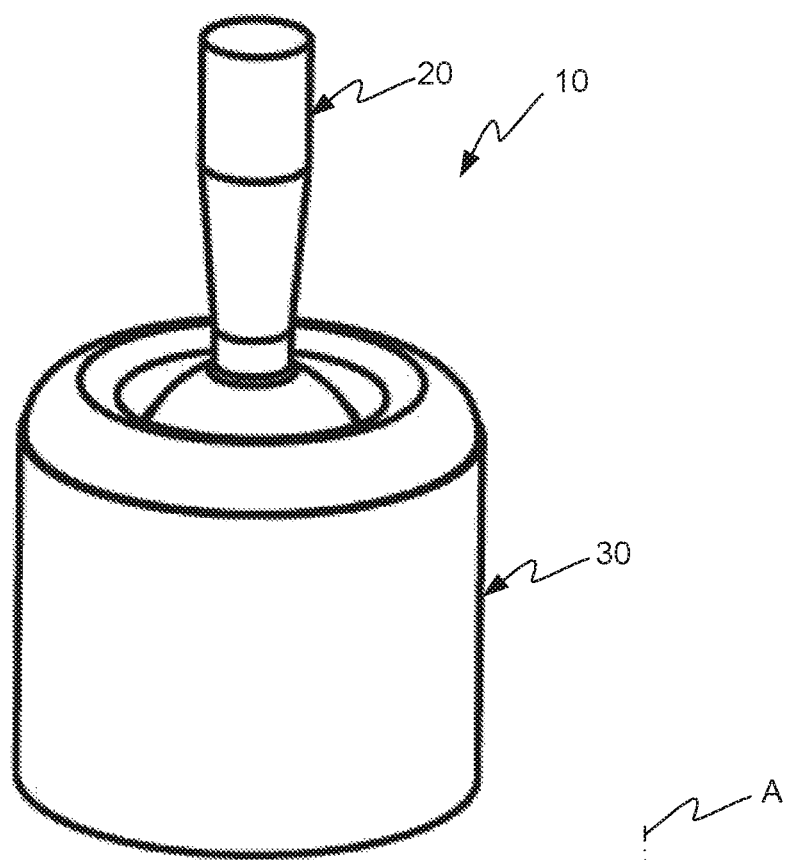
FIG. 1a-e show a kinematic pair according to a first embodiment of the invention.
Figure 1B:
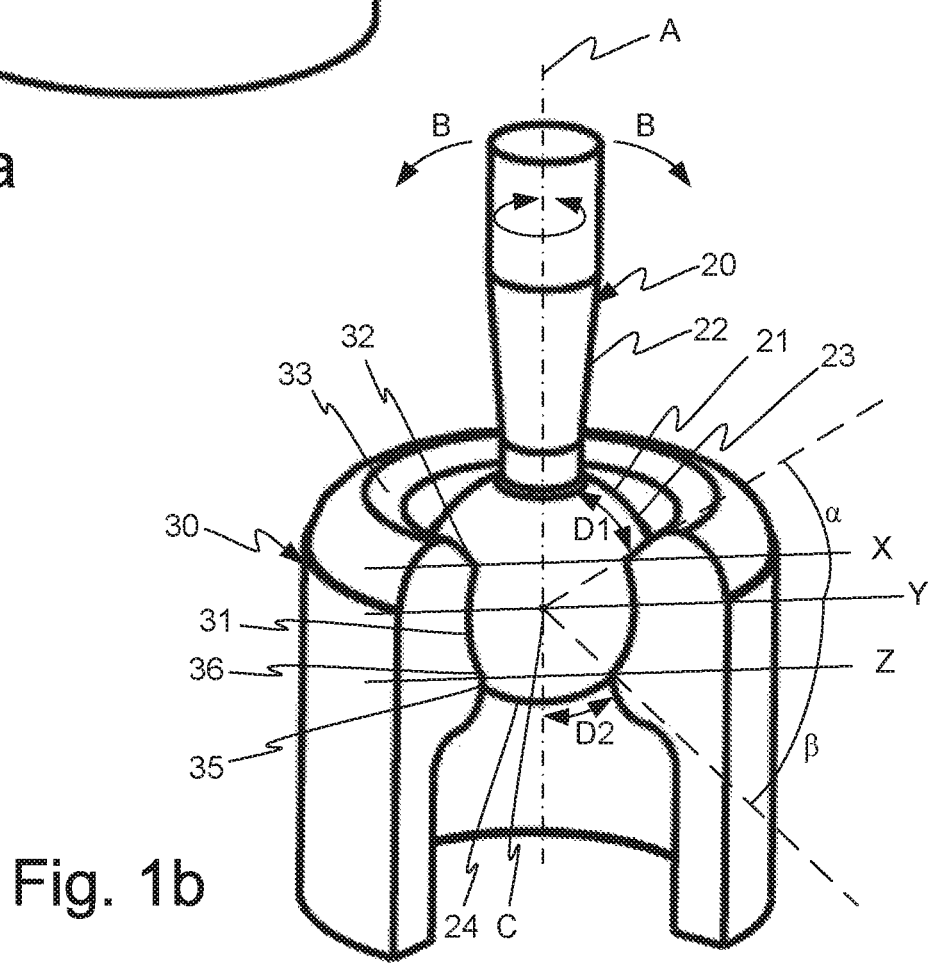
Figure 1C:
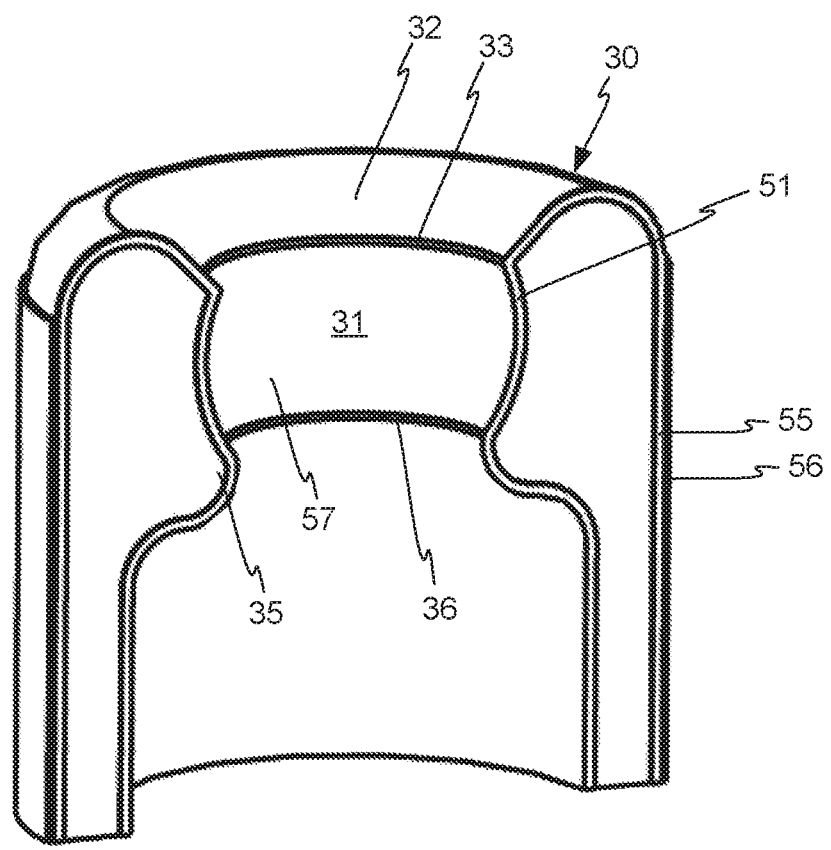

With reference to FIG. 1a-c a kinematic joint in the shape of a ball and socket joint 10 is illustrated in different views. The ball and socket joint 10 comprises an engagement element 20 with a ball 21 and a shaft 22, and a housing element or a socket 30 which is arranged to receive at least a part of the ball 21. The ball 21 is thus at least partly arranged within a seat 31 of the socket 30 and configured to achieve a rotational and/or sliding movement relative the socket 30 and relative an axis A. The engagement element 20 may be tilted downwards, shown by the arrow B, until the shaft 22 abuts an upper edge portion 32 of the seat 31. The upper edge portion 32 has a peripheral rim 33 which continuously extends around an upper part 23 of the ball 21 and which is the upper most engaging point between the ball 21 and the housing element 30. The location of the rim 33 should be provided in an upper plane X, above the plane Y of a center point C of the ball 21.

The upper plane X, which defines the rim 33 of the upper edge portion 32, is therefor arranged at a distance from the center plane Y forming an angle α relative the center point C of the ball 21. The angle α is between 5° and 85°, preferably between 25° and 55°. The range of the angle α also means that a distance D1 between the rim 33 and the shaft 22, when the shaft 22 is located in an upright position shown in FIG. 1a-b, is affected. The shorter the distance D1 is between the shaft 22, in the upright position, and the rim 33 the less freedom of movement the shaft 22 has. The distance D1 may also be measured between the rim 33 and the axis A. Later will be described in more detail how it is possible to arrange the rim 33 at an angle α of as little as 5°.

Further, the housing element 30 comprises a main engaging portion which is the seat 31, where the shape of the surface of the seat 31 corresponds to the shape of the outer surface of the ball 21. Later will be described how the seat 31 and the housing element 30 are manufactured around the ball 21.

The housing element 30 further comprises a lower edge portion 35 with a corresponding lower rim 36 which extends continuously around the lower part 24 of the ball 21 and which is the lower most engagement point between the ball 21 and the housing element 30. The lower rim 36 is provided in a lower plane Z which is located below the center plane Y forming an angle β relative the center point C of the ball 21. The angle β is between 5° and 90°, preferably between 25° and 85°. The range of the angle β also means that a distance D2 between the rim 36 and the axis A is affected. It is preferred not to enclose the entire lower part 24 of the ball 21 since the inner layer 51, shown in FIG. 1d-e, should be folded back during the manufacturing process.

Figure 1D:
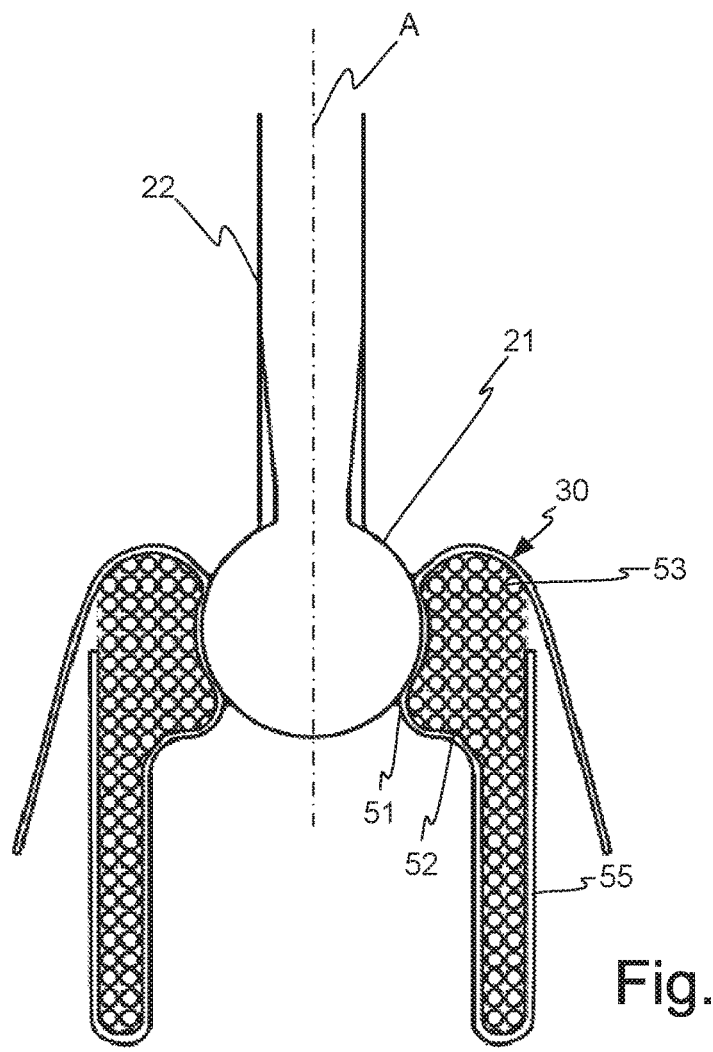
Figure 1E:
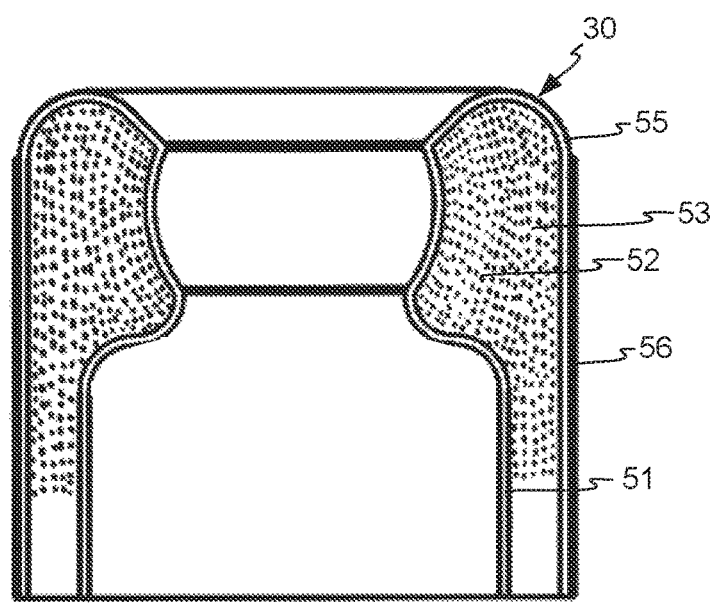

The manufacturing process of the housing element 30 appears from FIG. 1d-e which show the process steps in a schematic way. In order to be able to manufacture the housing element 30, a manufacturing tool (not shown) is preferably used to hold the ball 21. An inner layer 51, made of a carbon fiber material, is arranged around the manufacturing tool, in close contact with the ball 21. Preferably, the carbon fiber material is made as a braided texture in the shape of a sock or a tube which easily may be pulled up over the manufacturing tool, forming the inner layer 51. The carbon fiber material and its braided texture are further described below with reference to FIG. 7.

Once the inner layer 51 is in place, a tow 52 of a carbon fiber composite material is wound around a part of the inner layer 51 with an angle between 10 and 90°, preferably in an essentially transverse direction, i.e. close to 90°, with respect to a longitudinal direction of the first layer 51, i.e. about the axis A. The tow 52 is tightly wound several layers, essentially around a desired part of the ball 21 and thus forming a wrapping 53 for the seat 31 of the housing element 30. The tight wrapping 53 of the tow 52 forms a compact seat 31 with the shape of the ball 21. The wrapping may have different sizes and shapes depending on e.g. the size of the ball and/or the field of application of the ball and socket joint. Also the wrapping may include other carbon fiber structures, such as uni-directional fibers or weaves.

When the wrapping 53 is sufficient, an outer layer 55 is arranged over the wrapping 53 in order to prevent the wrapping 53 from moving out from the ball 21. The outer layer 55 is preferably formed of an extension of the inner layer 51, where the tube-shaped carbon fiber composite material of the inner layer 51 is folded over the wrapping 53, thereby enclosing the wrapping 53 between the inner layer 51 and the outer layer 55, which is shown in FIG. 1d. Optionally, an outer wrapping 56 of the carbon fiber composite material tow or weave is also provided on the outside of the outer layer 55 for extra tightening and locking of the outer layer 55. The compact wrapping 53 and the arrangement of the inner and outer layer 51, 55 enable the housing element 30 to maintain its shape around the ball 21 when the matrix material of the composite, i.e. the components of the carbon fiber composite material which is not carbon fiber, e.g. thermoset or thermo plastic, is hardened.

Due to the compact wrapping 53 and the features of the carbon fiber composite material, the rims 33, 36 create a very strong locking which prevents the ball 21 from escaping its position within the seat 31 of the housing element 30 when high tensile and compressive forces are applied to the ball 21. The carbon fiber composite material and the manufacturing process of the housing element 30 also enable the position of the upper rim 33 to be lowered towards the center plane Y, i.e. decreasing the angle α and increasing the distance D1 and thereby increasing the freedom of movement of the shaft 22, which is one of many advantages over prior art.

The housing element 30 may further comprise a coating element 57 which is arranged on the surface of the first carbon fiber composite material layer 51 facing the engagement element 20. The coating element 57 comprises a graphite based material, such as, but not limited, to vapor grown carbon nano tubes. This enhances the tribological properties between the engagement and housing element.

Since the housing element 30 is manufactured around the engagement element 20, very small tolerances of the fit and the precision between the housing element 30 and the engagement element 20 can be achieved. The engagement element 20, or its different parts, may be made entirely of either metal or carbon fiber composite, or of a combination thereof. The ball 21 may be provided with a covering or coating material (not shown), such as, but not limited to, CVD, CVA, DLC, or PVD coatings. The coating material enables the ball 21 to easily release from the seat 31 of the housing element and gives a low friction contact surface between the engagement element 20 and the housing element 30.

Figure 2A:
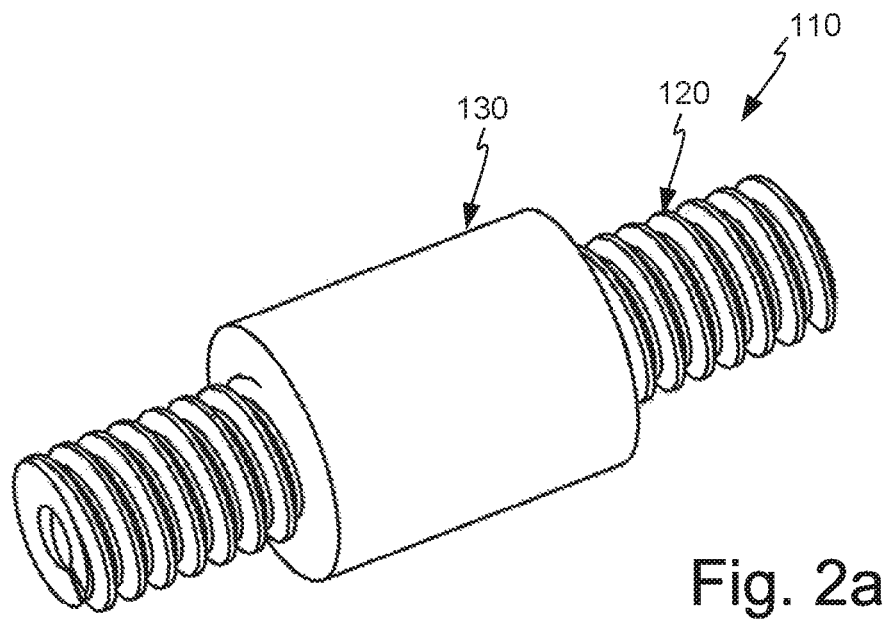
FIG. 2a-b show a kinematic pair according to a second embodiment of the invention.
Figure 2B:
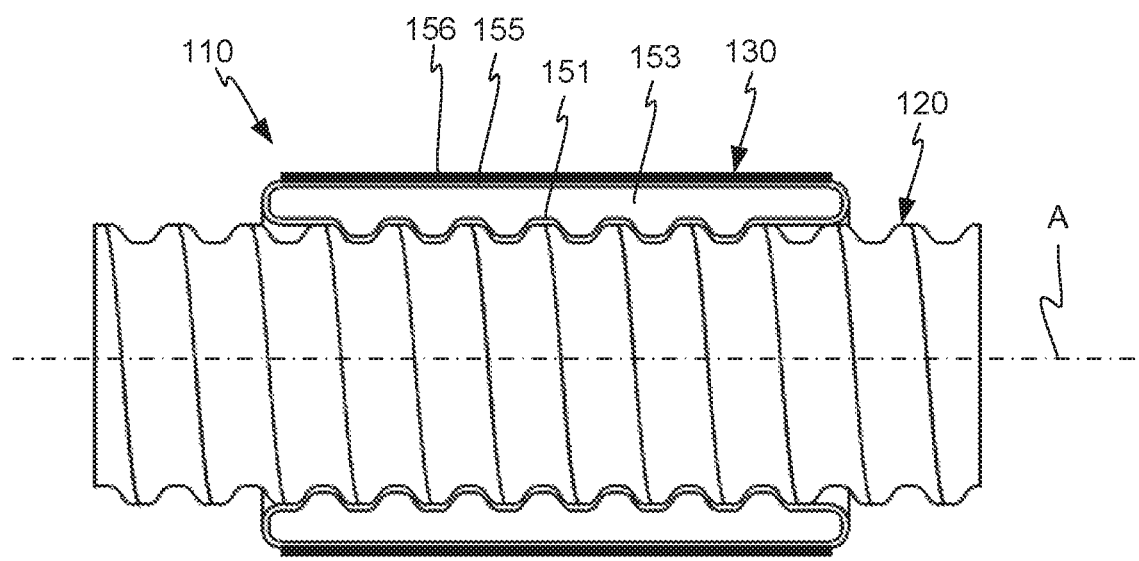
Figure 3A:
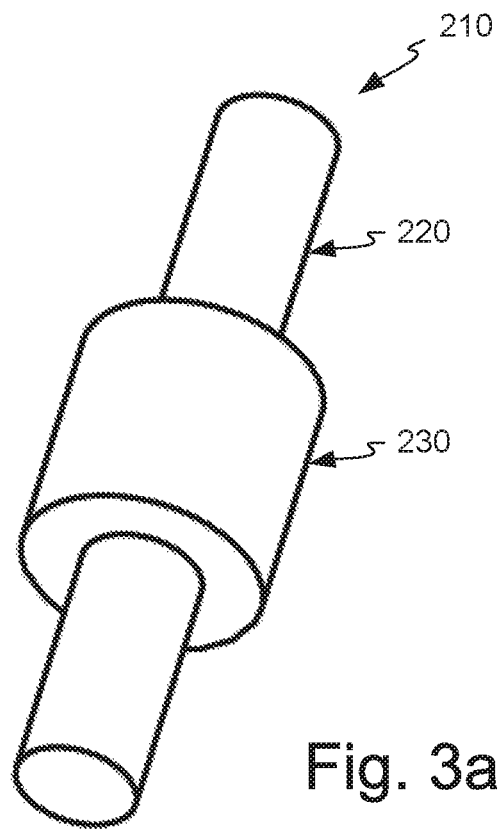
FIG. 3a-b show a kinematic pair according to a third embodiment of the invention.
Figure 3B:
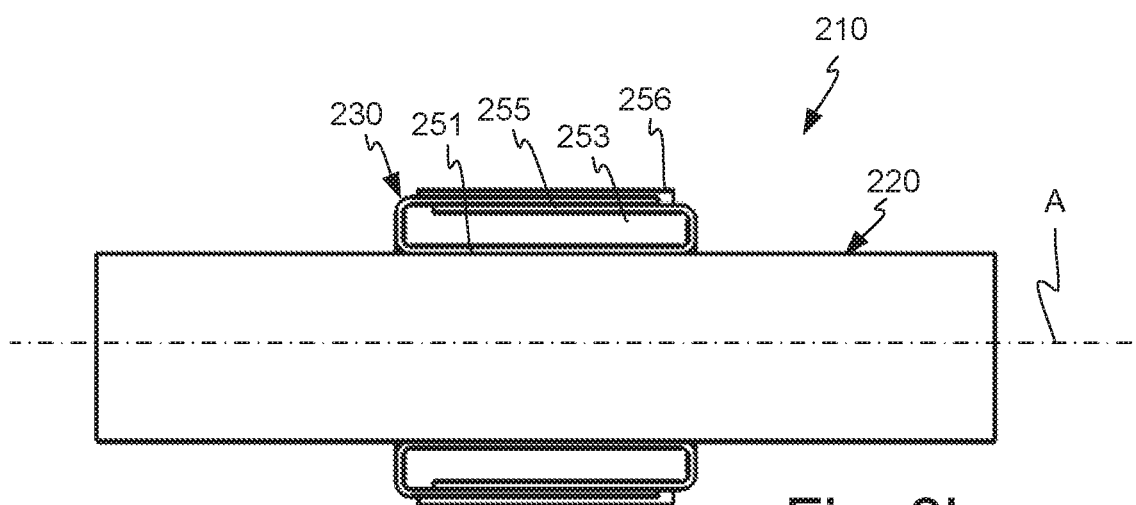

FIG. 2a-b show a kinematic pair 110 according to a second embodiment of the present invention comprising an engagement element 120 in the shape of a threaded element, and a housing element 130 which accommodates at least a part of the engagement element 120. The engagement element 120 is arranged to rotate about a longitudinal axis A of the engagement element 120 within the housing element 130. A similar kinematic pair 210 is shown in FIG. 3, but with the difference that the engagement element 220 is not a threaded element. This engagement element 220 is therefor arranged to both perform a rotational and a sliding movement within the housing element 230.

The housing elements 130, 230, shown in FIGS. 2a-b and 3a-b, are manufactured in basically the same way, with an inner layer 151, 251, and outer layer 155, 255 and a wrapping 153, 255, as described above but with a manufacturing tool suitable for the size and shape of the specific engagement element 120, 220. The length of the housing element 130, 230 may be manufactured in various ways depending on the desired application.

Figure 4A:
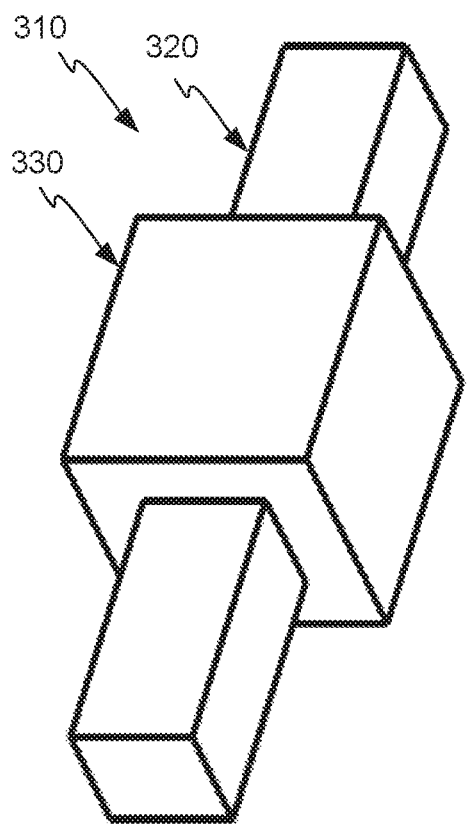
FIG. 4a-b show a kinematic pair according to a fourth embodiment of the invention.
Figure 4B:
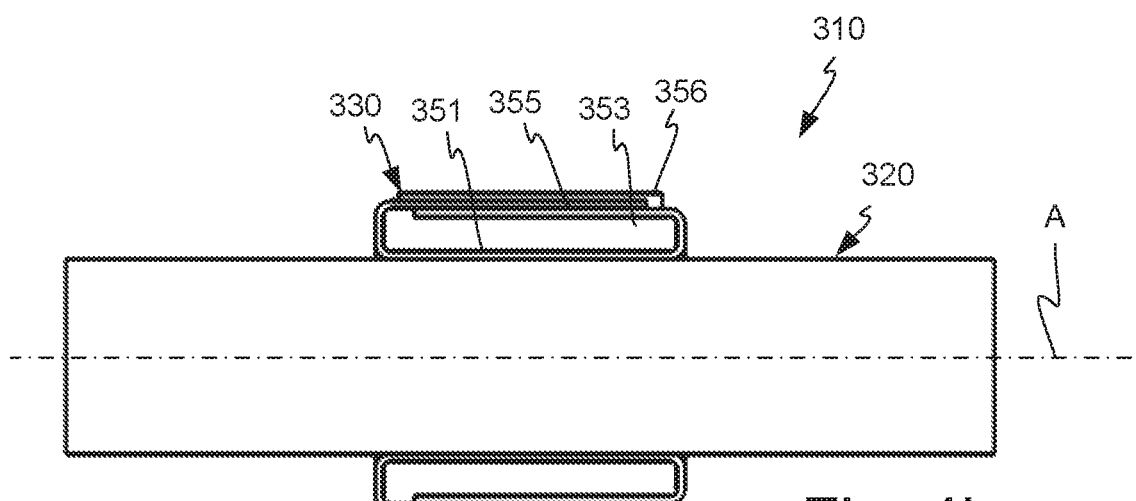

FIG. 4a-b show a kinematic pair according to yet another embodiment, comprising an engagement element 320 which has a quadrangular shape, and which is adapted to achieve a sliding movement within a housing element 330. The housing element 330 has, due to the same manufacturing process as described above with an inner and outer layer 351, 355 and a wrapping 353, an inner portion or seat with the same quadrangular shape as the outer portion of the engagement element 320.

Figure 5A:
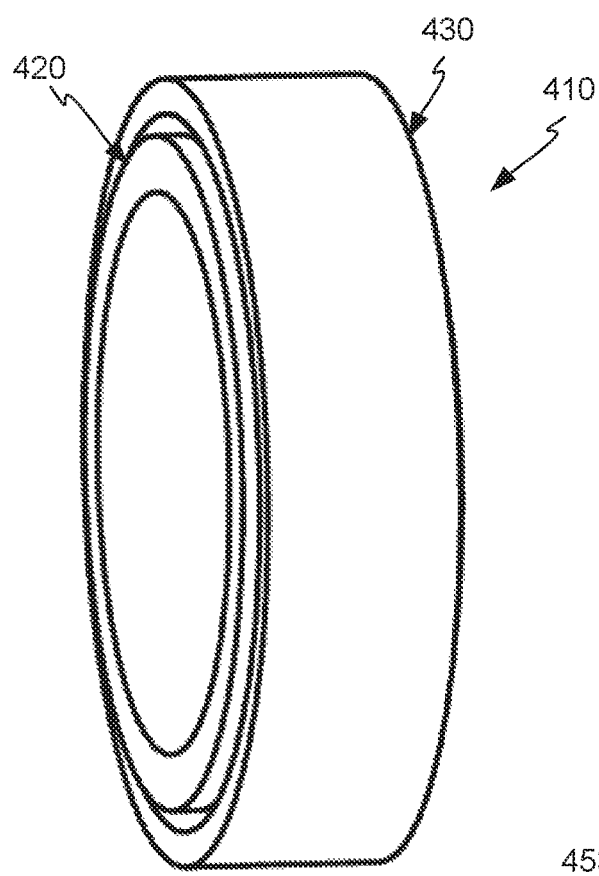
FIG. 5a-b show a kinematic pair according to a fifth embodiment of the invention.
Figure 5B:
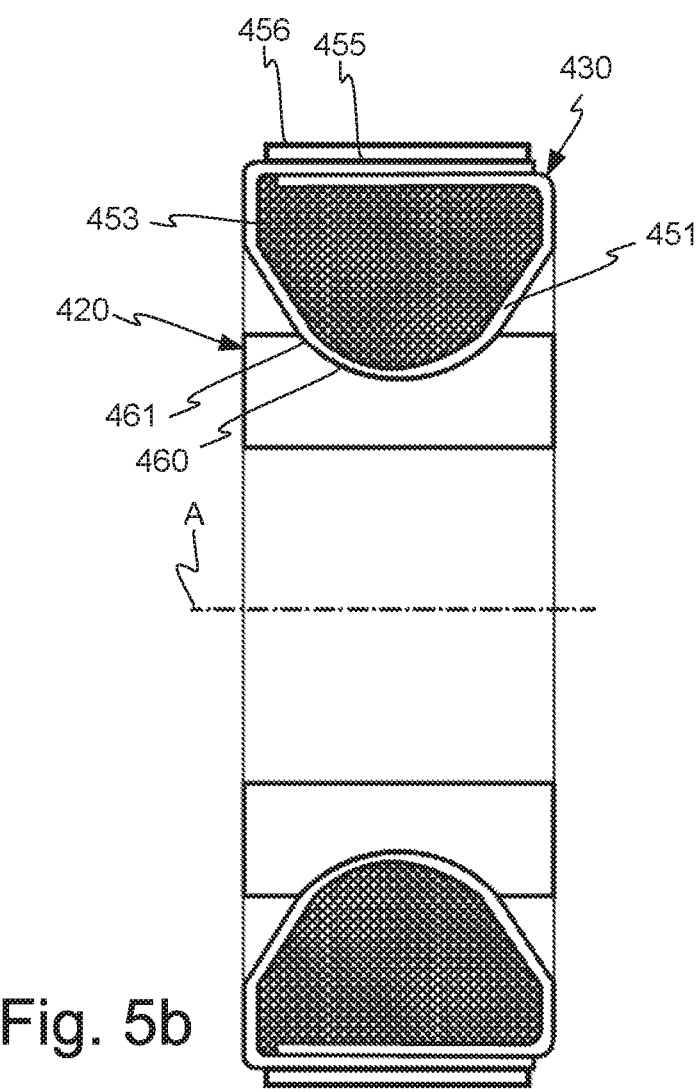

FIG. 5a-b show a part of a kinematic pair according to an embodiment, where an engagement element 420 is allowed to rotate about the axis A within a housing element 430. Both housing element 430 and engagement element 420 has a cylindrical (rotational symmetrical) shape but where the outer surface of the engagement element 420 has a groove 460 and the housing element 430 is manufactured with a protrusion 461 which runs in the groove 460. In an alternative embodiment the groove and protrusion may also be the other way around (not shown), where the groove is in the housing element and the protrusion is coming from the engagement element. In yet another alternative embodiment (not shown) there may be multiple grooves and protrusions of different sizes and shapes.

During the manufacturing process of the housing element 430 an inner layer 451 is applied in the groove 460 which then is followed by a wrapping 453 for filling the groove 460 and which is applied until the proper size of the housing element 430 is achieved. After the wrapping 453 is applied, an outer layer 455 is achieved, like previously described, by folding the material piece, which also forms the inner layer 451, back around the wrapping 453. An optional outer wrapping 456 may then be applied to the outer surface of the outer layer 455 for fixing the structure.

Figure 6A:
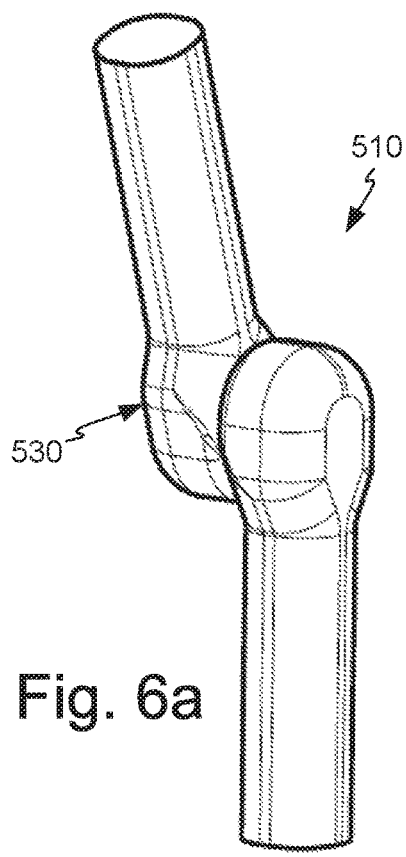
FIG. 6a-b show a kinematic pair according to a sixth embodiment of the invention.
Figure 6B:
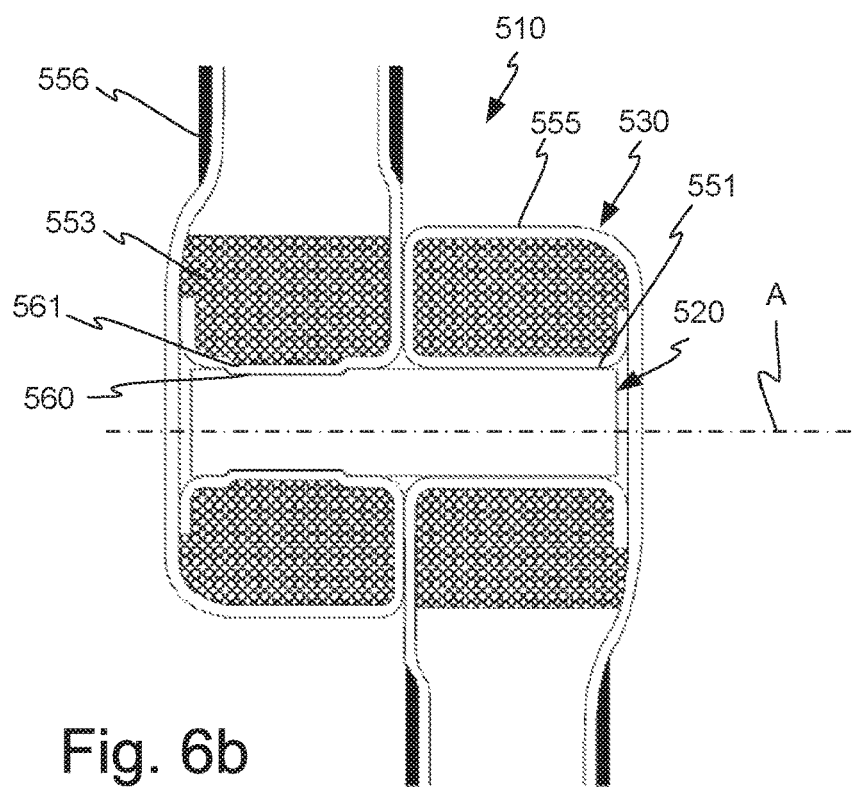

FIG. 6a-b show a kinematic pair 510 according to yet another embodiment comprising an engagement element 520, with a groove 560, and a housing element 530 with a protrusion 561 which is able to engage the groove 560. The engagement element 520 is only able to rotate within the housing element 530 similar to the housing element 430 in FIG. 5, and/or similar to the housing element 230 shown in FIG. 3. The housing element 530 is manufactured in basically the same way as described above but instead of only using a wrapping when forming the housing element 530 a distance element may be used. A distance element of any type and material may be used which is beneficial for the intended application. In an alternative embodiment, the housing element 530 may be connected to or manufactured with a second housing element (not shown) which is e.g. mirror-inverted. Also more than two housing element may be connected to each other.

Figure 7:
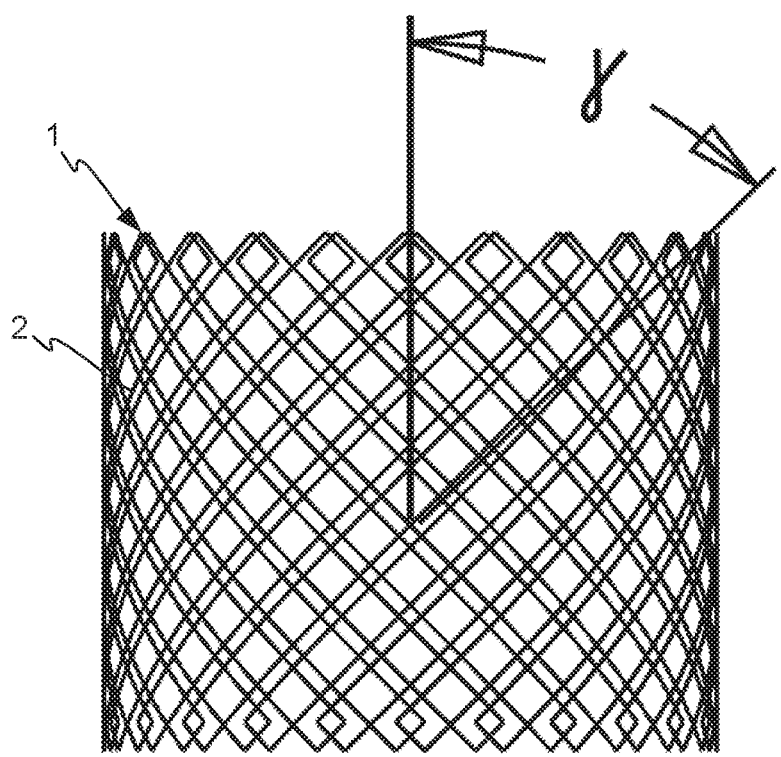
FIG. 7 shows a material used when manufacturing kinematic pairs.

Throughout the manufacturing process of the different elements, a carbon fiber composite material is used. The described inner and outer layers are made of a braided fabric 1 of the carbon fiber composite which is shown in FIG. 7. The fabric 1 is achieved by braiding together portions 2 of the carbon fiber composite at an angle γ of about 45°. In other embodiments of the braided fabric the angle is between 1° and 89°, i.e. more than 0° and less than 90°, preferably between 40° and 50° and most preferably 45°. The fabric 1 is also preferably manufactured as a sock or a tube. The tube-shape makes it easy to pull over and attach to the portion of the engagement element and the possible tools forming the inside of the manufactured housing element, and fold over and enclose the wrapping as described above. Several layers of the braided fabric may be used in the same manufacturing process if so desired. The carbon fiber composite material may preferably comprise a thermoset carbon fiber composite, but can in other embodiments be any carbon fiber composite, such as, but not limited to thermoplastic, crystalline, or metal.

The tows, which are wound around the inner layer/layers, are made of the same carbon fiber composite material as the braided fabric 1, but may in another embodiment be made of any carbon fiber composite. The same tow is preferably also used in the wrapping around the outer layer. The wrapping of the tow is very tight with an average fiber volume fraction up to 86%.

The choice of the carbon fiber composite material does not only make the weight of the elements low but the elements are also very strong depending on the type of carbon fiber type used and resistant against great tensile and compression forces which may be applied to at least the engagement element and which the housing element must endure.

The carbon fiber composite material may be manufactured using any manufacturing method; such as—but not limited to—wet lay-up, vacuum injection, resin transfer molding (RTM), VARTM, or pre-preg manufacturing in autoclave.

Finally, although the inventive concept has been described above with reference to specific embodiments, it is not intended to be limited to the specific form set forth herein. Rather, the invention is limited only by the accompanying claims and, other embodiments than the specific above are equally possible within the scope of these appended claims.

The invention claimed is:

1. A housing element for a kinematic pair, comprising a housing element-and an engagement element, wherein the engagement element is arranged at least partly within the housing element and configured to achieve a rotational and/or sliding movement relative the housing element, wherein the housing element comprises:
    at least one first carbon fiber composite material layer surrounding at least a part of the engagement element;
    a carbon fiber composite material wrapping arranged around at least a part of the first layer; and
    at least one second carbon fiber composite material layer arranged on the outside of the wrapping.

2. The housing element according to claim 1, wherein the first and second layer comprise a braided texture of a carbon fiber composite material.

3. The housing element according to claim 1, wherein said first layer and said second layer form parts of one and the same carbon fiber composite material piece.

4. The housing element according to claim 1, wherein the carbon fiber composite material comprises a thermoset plastic, thermoplastic, crystalline, or metal material.

5. The housing element according to claim 1, further comprising a coating element which is arranged on the surface of the first carbon fiber composite material layer facing the engagement element, wherein the coating element comprises a graphite based material.

6. The housing element according to claim 1, wherein the housing element is a socket in a ball and socket joint.

7. A kinematic pair comprising:
    (a) a housing element comprising:
        at least one first carbon fiber composite material layer;
        a carbon fiber composite material wrapping arranged around at least a part of the first layer; and
        at least one second carbon fiber composite material layer arranged on the outside of the wrapping; and
    (b) an engagement element arranged at least partly within the housing element and configured to achieve a rotational and/or sliding movement relative to the housing element, the first layer surrounding at least a part of the engagement element.

8. The kinematic pair according to claim 7, wherein the housing element is a socket and the engagement element is a ball, together forming a ball and socket joint.

9. The kinematic pair according to claim 8, wherein the socket comprises an upper portion with a rim which is arranged at an angle ($\alpha$) relative to the center (C) of the ball, wherein the angle ($\alpha$) is between 5 and 85°.

10. The kinematic pair according to claim 8, wherein the socket comprises an upper portion with a rim which is arranged at an angle ($\alpha$) relative to the center (C) of the ball, wherein the angle ($\alpha$) is between 25 and 55°.

11. A method for manufacturing a housing element of a kinematic pair, wherein the kinematic pair comprises a housing element and an engagement element where the engagement element is arranged at least partly within the housing element and configured to achieve a rotational and/or sliding movement relative to the housing element, comprising the steps of:
    arranging at least one first carbon fiber composite material layer around at least a part of the engagement element;
    winding a carbon fiber composite material around at least a part of said first layer forming at least one wrapping; and
    arranging at least one second carbon fiber composite material layer on the outer most wrapping.

12. The method according to claim 11, further comprising the step:
    winding said carbon fiber composite material around at least a part of said second layer forming at least one outer wrapping.

13. The method according to claim 11, wherein said first and second layer is formed by a braided texture of a carbon fiber composite material which is braided or wound at an angle ($\gamma$) for crossing over one another, wherein said angle ($\gamma$) is more than 0° but less than 90°.

14. The method according to claim 11, wherein said first and second layer is formed by a braided texture of a carbon fiber composite material which is braided or wound at an angle ($\gamma$) for crossing over one another, wherein said angle ($\gamma$) is between 40 and 50°.

15. The method according to claim 11, wherein said first and second layer is formed by a braided texture of a carbon fiber composite material which is braided or wound at an angle ($\gamma$) for crossing over one another, wherein said angle ($\gamma$) is approximately 45°.

16. The method according to claim 11, wherein the step of winding the carbon fiber composite material around at least a part of said first layer further comprises winding the carbon fiber composite material with an angle between 10 and 90° in a transverse direction, with respect to a longitudinal direction of the first layer.

17. The method according to claim 11, wherein the step of arranging at least one second carbon fiber composite material layer further comprises:
    folding a portion of the first layer over the wrapping forming the second layer.

* * * * *